(12) United States Patent
Pendakur et al.

(10) Patent No.: US 8,560,453 B2
(45) Date of Patent: Oct. 15, 2013

(54) METHOD AND APPARATUS FOR DYNAMIC, REAL-TIME AD INSERTION BASED ON META-DATA WITHIN A HARDWARE BASED ROOT OF TRUST

(75) Inventors: Ramesh Pendakur, Gaston, OR (US); Gyan Prakash, Beaverton, OR (US); Walter C. Gintz, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 193 days.

(21) Appl. No.: 13/173,584

(22) Filed: Jun. 30, 2011

(65) Prior Publication Data

US 2013/0006866 A1 Jan. 3, 2013

(51) Int. Cl.
*G06F 21/00* (2013.01)
*G06Q 30/00* (2012.01)

(52) U.S. Cl.
USPC ............... 705/51; 705/50; 705/52; 705/14.4; 705/14.49; 705/14.53; 705/14.66; 705/14.67; 725/32

(58) Field of Classification Search
USPC ............... 705/50–52, 14.4, 14.49, 14, 14.53, 705/14.66, 14.67; 725/32, 34; 713/153; 380/200
See application file for complete search history.

(56) References Cited

U.S. PATENT DOCUMENTS

| | | | |
|---|---|---|---|
| 5,892,900 A * | 4/1999 | Ginter et al. ..................... 726/26 |
| 6,505,169 B1 * | 1/2003 | Bhagavath et al. ........ 705/14.66 |
| 7,203,310 B2 * | 4/2007 | England et al. ............... 380/200 |
| 7,233,669 B2 | 6/2007 | Candelore |
| 7,284,135 B2 * | 10/2007 | Evans et al. .................... 713/192 |
| 7,293,178 B2 * | 11/2007 | Evans et al. .................... 713/192 |
| 7,380,130 B2 * | 5/2008 | England et al. ............... 713/189 |
| 8,144,182 B2 * | 3/2012 | Shoemake et al. ......... 348/14.04 |
| 8,196,162 B2 * | 6/2012 | van de Klashorst ........... 725/32 |
| 8,307,392 B2 * | 11/2012 | Ahanger et al. ................ 725/36 |
| 2007/0055984 A1 * | 3/2007 | Schiller et al. .................. 725/32 |
| 2007/0100771 A1 * | 5/2007 | Eckleder et al. ............... 705/67 |
| 2008/0114861 A1 * | 5/2008 | Gildred ......................... 709/219 |
| 2008/0240447 A1 | 10/2008 | Zhu et al. |
| 2009/0163227 A1 * | 6/2009 | Collins ...................... 455/456.3 |
| 2009/0319782 A1 | 12/2009 | Lee |
| 2010/0205261 A1 * | 8/2010 | Michel ......................... 709/206 |
| 2010/0250957 A1 | 9/2010 | Cuppett |
| 2012/0030704 A1 * | 2/2012 | Schiller et al. ................. 725/34 |
| 2012/0198070 A1 * | 8/2012 | Black et al. .................. 709/226 |

FOREIGN PATENT DOCUMENTS

| | | |
|---|---|---|
| WO | 2013/003279 A2 | 1/2013 |
| WO | 2013/003279 A3 | 2/2013 |

OTHER PUBLICATIONS

International Search Report and Written Opinion Received for PCT Application No. PCT/US2012/044021, Mailed on Dec. 26, 2012, 13 pages.

* cited by examiner

*Primary Examiner* — Steven Kim
(74) *Attorney, Agent, or Firm* — Steven Skabrat

(57) ABSTRACT

A client computing system inserts selected advertising into digital content. Ads may be inserted into content based on a dynamic advertising matching process that is securely implemented within a hardware-based root of trust. User profiles used in ad matching may be privacy protected and maintained with confidentiality protection in the client computing system and/or a service provider server, respectively. When a client computing system makes a request to the service provider server for content with specified ad slots, the request may be made with the client's EPID signature, which is inherently privacy protected. The hardware-based root of trust protects insertion of selected ads into the linear rendering flow of the content.

21 Claims, 8 Drawing Sheets

METHOD AND APPARATUS FOR DYNAMIC, REAL-TIME AD INSERTION BASED ON META-DATA WITHIN A HARDWARE BASED ROOT OF TRUST

FIELD

The present disclosure generally relates to the field of computing system architectures for securely processing digital content. More particularly, an embodiment of the invention relates to dynamic, real-time ad insertion into digital content by a computing system based on meta-data within a hardware-based root of trust.

BACKGROUND

On open computing platforms, such as a personal computer (PC) system for example, when playing premium content (such as from a DVD, Blu-Ray, etc.), the digital rights management (DRM) processing and key management are typically performed in software by a media player application program. These schemes are not well protected and there have been instances of hacking, resulting in pirated content and loss of revenue to content owners. When content is played, even though the media decompression (such as H.264, MPEG-2, etc.) is done in hardware, the content is in the clear in system memory and can be stolen with software-based and/or hardware-based attacks. Due to these noted security weaknesses, only lower fidelity (such as standard definition (SD)) content or less valuable high definition (HD) content is typically distributed to open computing platforms. Improvements to the secure handling of digital content by open computing platforms (such as a PC, for example) are desired.

BRIEF DESCRIPTION OF THE DRAWINGS

The detailed description is provided with reference to the accompanying figures. The use of the same reference numbers in different figures indicates similar or identical items.

DETAILED DESCRIPTION

Embodiments of the present invention comprise a system architecture that provides a hardware-based root of trust (HW ROT) solution for supporting distribution and playback of premium digital content. In an embodiment, HW ROT for digital content and services is a solution where the basis of trust for security purposes is rooted in hardware and firmware mechanisms in a client computing system, rather than in software. From this root of trust, the client computing system constructs an entire media processing pipeline that is protected for content authorization and playback. In embodiments of the present invention, the security of the client computing system for content processing is not dependent on the operating system (OS), basic input/output system (BIOS), media player application, or other host software. In order to compromise the system, one will need to compromise the hardware and/or firmware mechanisms, as opposed to attacking the software running on top of the OS.

Embodiments of the present invention provide for dynamic, real-time insertion of advertising into digital content being processed by the client computing system based on meta-data within the hardware-based root of trust.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs stored on a computer readable storage medium ("software"), or some combination of hardware and software. For the purposes of this disclosure reference to "logic" shall mean hardware, software (including for example micro-code that controls the operations of a processor), firmware, or some combination thereof.

Figure 1:
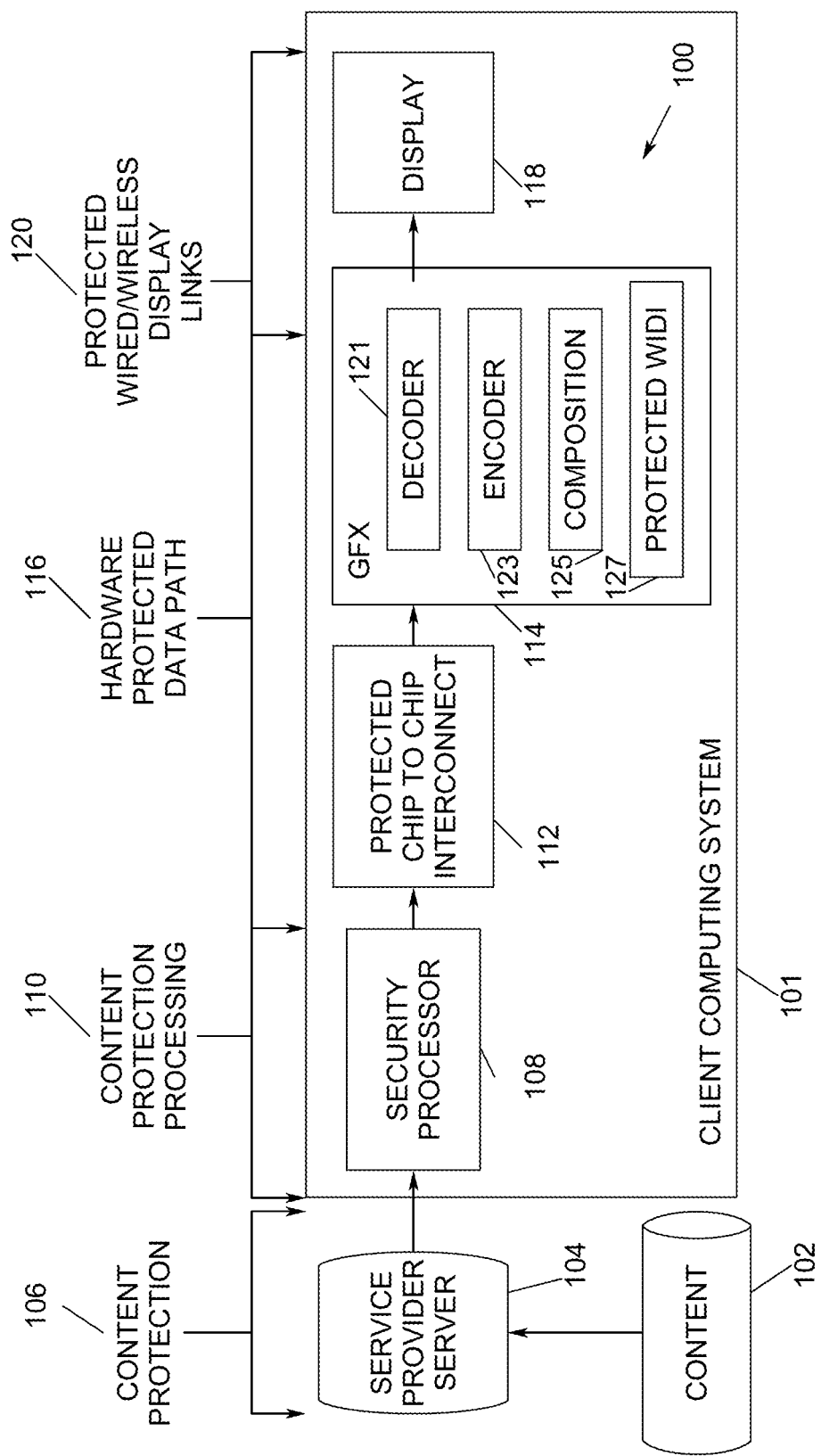
FIG. 1 is a diagram of a secure content processing pipeline according to an embodiment of the present invention.

Embodiments of the present invention protect content protection processing, key management processing, and content playback by using firmware and hardware in the CPU, chipset and integrated graphics/media engine of a client computing system 101 to perform these functions. Embodiments of the present invention provide end-to-end protection of the content as the content is processed by components within a computing system. FIG. 1 is a diagram of a secure content processing pipeline 100 according to an embodiment of the present invention. Content 102 may be accessible by a service provider (SP) server 104. Content 102 may be any digital information, such as audio, video, or audio/video data, images, text, books, magazines, games, or application programs. Service provider server 104 may include one or more servers for providing the content to a client computing system over any telecommunications channel (such as the Internet, cellular networks, wired or wireless networks, etc.). Content may be protected by any known content protection technology 106 (e.g., digital rights management (DRM) technology, cryptographic techniques, etc.) while stored in the SP server and during transfer to the client computing system 101. In one embodiment, the content may be protected by the Enhanced Privacy ID (EPID) signature verification protocol as discussed herein. In one embodiment, video data may be encrypted using the Advanced Encryption Standard (AES) cryptographic processing with CTR mode. The client computing system 101 may be a PC, laptop, netbook, tablet computer, handheld computer, smart phone, personal digital assistant (PDA), set top box, consumer electronics equipment, or any other computing device capable of receiving, storing and rendering content.

Within the client computing system, content protection processing 110 may be performed by a Security Processor 108. In one embodiment, the security processor may be within a chipset of the client computing system. In an embodiment, the chipset comprises a platform control hub (PCH). In another embodiment, the Security Processor may be within the CPU of the client computing system. In another embodiment having a system-on-chip (SOC) configuration, the Security Processor may be integral with other system components on a single chip. In one embodiment, the security processor comprises a Manageability Engine (ME). In other embodiments, other types of security processors may be used. The Security Processor is a subsystem implemented in hardware and firmware that interacts with other components of the client computing system. The Security Processor operates by loading firmware code from a protected flash memory region and executing the firmware code in protected memory. Since the content protection processing is performed in hardware and firmware within the Security Processor, protection of the content may be improved over software-based systems.

Cryptographic key information may be sent from the security processor over a protected chip to chip interconnect 112 to a component containing a central processing unit (CPU) and an integrated graphics (GFX)/media engine. In an embodiment, the protected chip to chip interconnect 112 comprises a secure Direct Media Interface (DMI) communications link to the CPU/GFX component. DMI comprises a chip-to-chip interconnect with two unidirectional lanes of concurrent data traffic, and isochronous transfer with improved quality of service. Data transferred over the DMI link may be protected by known cryptographic processing techniques. In an embodiment, the chip-to-chip secure link may be used for passing encrypted title keys over the DMI. Security is based on a shared secret between the PCH and the CPU. This shared secret may be established on each power cycle and can vary between families of products, generations and random groupings as needed to ensure protection and integrity of the shared secret. The DMI mechanism is independent of the OS, the BIOS, and software running on the CPU. The DMI mechanism may be used to create a trust relationship between the security processor (in the PCH) and the CPU.

The GFX engine 114 may include content protection processing to decrypt the content. The GFX engine also includes decoder logic 121 to process/decode the decrypted audio/video content and pass the audio/video content as media blocks to a graphics processing unit (GPU) within the GFX engine 114. The GPU includes security techniques, including using encoder logic 123, to protect the media blocks during processing in memory. GFX engine 114 also includes composition logic 125 to compose the image data to be shown on display 118. As the content is being handled within and between the security processor in the PCH and the GFX engine in the CPU/GFX component, the content may be protected by a hardware protected data path 116. In an embodiment, the hardware protected data path comprises a Protected Audio Video Path (PAVP) to maintain the security of the content. PAVP also supports an encrypted connection state between system components. By using the PAVP, the system may further protect the content during transfer between system components and within memory.

The interface between the GFX engine, the PCH, and the display 118 may be implemented by protected wired/wireless display links 120. In one embodiment, display data sent from the GFX engine via a memory through the PCH to the display may be protected by a High-Bandwidth Digital Content Protection (HDCP) content protection scheme. The HDCP specification provides a robust, cost-effective and transparent method for transmitting and receiving digital entertainment content to compliant digital displays. In an embodiment, the wired link may be implemented according to the HDCP Specification, Revision 2.0, available from Digital Content Protection, LLC, or subsequent revisions. HDCP may be employed to deter copying of the display data as the data travels over a DisplayPort, Digital Visual Interface (DVI), High-Definition Multimedia Interface (HDMI), Gigabit Video Interface (GVIF), or a Unified Display Interface (UDI) connection. The HDCP revision 2.0 specification addresses emerging usage models that let end users conveniently connect displays, devices and home theater systems via standard protocols and interfaces like TCP/IP, USB, Wi-Fi and WirelessHD. The HDCP revision 2.0 specification uses standards-based RSA public key and Advanced Encryption Standard (AES) 128-bit encryption for robust content protection. In an HDCP system, two or more HDCP devices are interconnected through an HDCP-protected interface. The audiovisual content protected by HDCP flows from the Upstream Content Control Function into the HDCP system at the most upstream HDCP Transmitter. From there, the HDCP content, encrypted by the HDCP system, flows through a tree-shaped topology of HDCP receivers over HDCP-protected interfaces.

The HDCP content protection mechanism includes three elements: 1) Authentication of HDCP receivers to their immediate upstream connection (to an HDCP transmitter). The authentication protocol is the mechanism through which the HDCP transmitter verifies that a given HDCP Receiver is licensed to receive HDCP. 2) Revocation of HDCP receivers that are determined by the DCP to be invalid. 3) HDCP encryption of audiovisual content over the HDCP-protected interfaces between HDCP transmitters and their downstream HDCP receivers. HDCP receivers may render the HDCP content in audio and visual form for human consumption. HDCP receivers may be HDCP repeaters that serve as downstream HDCP transmitters emitting the HDCP content further downstream to one or more additional HDCP receivers. In one embodiment, display data sent to the display 118 may be sent over a protected wireless display (WiDi) link 127 using 802.11n wireless local area network (WLAN) technology.

As can be seen from FIG. 1, in embodiments of the present invention, from the time the content is received from the service provider server 104 until the content is displayed on the display 118, no cryptographic key or content is available in unencrypted form to any software or unauthorized hardware running on the computing system. Further, memory protection for video data is offered over the whole chain across the decrypt, decode/encode, compose and display pipelines. This capability is offered at the full memory bandwidth without compromising overall system performance.

Figure 2:
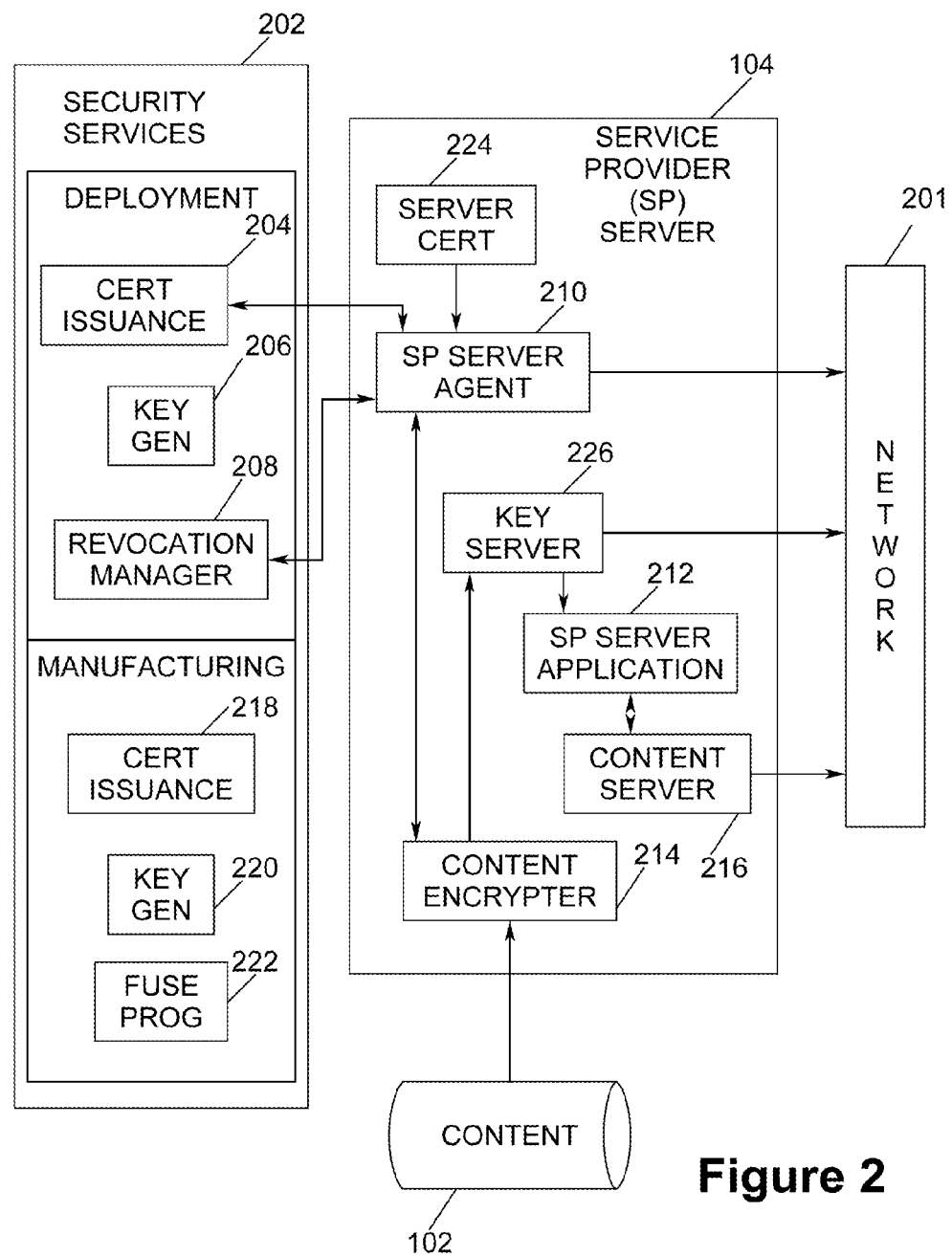
FIG. 2 is a diagram of a service provider server and security services infrastructure according to an embodiment of the present invention.

FIG. 2 is a diagram of a service provider server 104 and a security services component 202 according to an embodiment of the present invention. In an embodiment, security services component 202 may comprise one or more servers and/or components. In an embodiment, the security services component may be operated by the manufacturer of one or more components of the client computing system. The security services component provides capabilities for controlling client computing systems in the field. The security services component comprises a manufacturing component and a deployment component. The manufacturing component includes a certificate issuance component 218, a key generation (Key Gen) component 220, and a fuse programming (Fuse Prog) component 222. Certificate issuance 218 generates and issues public key certificates to each of the client computing platforms. Key Gen 220 is responsible for generating the private and public key pairs as needed for embedding into the client computing platforms. Fuse programming 222 is responsible for programming the fuses on the manufacturing floor with appropriate values in a robust and secure manner. These values would be used by the client computing platform to build up the trust anchors and key ladders inside the security processor.

The deployment component includes a certificate issuance component 204, a key generation (Key Gen) component 206, and a revocation manager 208. Certificate (Cert) issuance component 204 issues a digital certificate for the SP Server and Client components giving them the authorization to interact with such client systems for service deployment. Key generation (Key Gen) component 206 generates a cryptographic signing key pair, a root key pair, digital certificates, and group public keys, and signs the group public keys for each group. Revocation manager 208 determines identifiers and signatures of client computing systems to be added to a revocation list (RL), updates the RL, and distributes updated RLs.

The SP server 104 communicates over network 201 (such as the Internet) with the client computing system. The service provider server comprises a SP server application 212 and a SP server agent 210. The SP server application provides content browsing capabilities. The SP server agent 210 controls the sending of client specific messages, manages cryptographic keys and authorized user tokens, and maintains content delivery service status (for deployment purposes 212 and 210 could be physically different servers firewalled and separated). Content encrypter 214 accepts content 102 and encrypts the content for secure delivery to a client computing system. Content server 216 sends the encrypted content to the client. Key server 226 is responsible for provisioning the title keys to the client computing systems within an authenticated session. Server certificate 224 is used by the SP server agent to participate in mutual authentication and establishment of the authenticated session with the client computing systems. Communications links between SP server agent 210, key server 226, and content server 216 are protected by well accepted information security practices. The key server has the highest network and access protection to ensure only authorized parties are able to reach it and the keys managed by the key server are isolated and firewalled from attackers from outside network entities. The SP server agent or the key server has access to the private key associated with the server certificate 224. In an embodiment, this private key and all operations done with this private key are protected using a hardware security module (HSM) (not shown in FIG. 2) on the server.

In an embodiment, the cryptographic scheme used to authenticate the client computing system with the SP server comprises a cryptographic authentication protocol protecting a user's privacy based on the use of zero-knowledge proofs. In an embodiment, the cryptographic authentication protocol comprises the Enhanced Privacy ID (EPID) scheme, a Direct Anonymous Attestation (DAA) scheme with enhanced revocation capabilities. EPID mitigates the privacy issues of common Rivest, Shamir, Adleman (RSA)—public key infrastructure (PKI) security implementations where every individual is uniquely identified for each transaction. Instead, EPID provides the capability of remote attestation but only identifies the client computing system as having a component (such as a chipset) from a particular technology generation. EPID is a group signature scheme, where one group's public key corresponds to multiple private keys, and private keys generate a group signature which is verified by the group public key. EPID provides the security property of being anonymous and unlinkable—given two signatures, one cannot determine whether the signatures are generated from one or two private keys. EPID also provides the security property of being unforgeable—without a private key, one cannot create a valid signature.

Generally, setting up a secure communications channel with EPID may be accomplished as follows. A first party (such as the client computing system) sends an EPID certificate to a second party (such as the service provider server). Never knowing the identity of the first party and only knowing the first party is a computing platform with a trusted security processor, the second party authenticates the first party. The first party then authenticates the second party using the second party's public key certificate. Since the second party doesn't require privacy, the second party's public key certificate may not be an EPID certificate (but it could be). The parties may then enter into a Diffie-Hellman (DH) key exchange agreement.

Various suitable embodiments of DAA and EPID are described in the following co-patent applications, incorporated herein by reference: "An Apparatus and Method of Direct Anonymous Attestation from Bilinear Maps," by Ernest F. Brickell and Jingtao Li, Ser. No. 11/778,804, filed Jul. 7, 2007; "An Apparatus and Method for a Direct Anonymous Attestation Scheme from Short-Group Signatures," by Ernest F. Brickell and Jingtao Li, Ser. No. 12/208,989, filed Sep. 11, 2008; and "Direct Anonymous Attestation Scheme with Outsourcing Capability," by Ernest F. Brickell and Jingtao Li, Ser. No. 12/286,303, filed Sep. 29, 2008. In other embodiments, other authentication and attestation schemes may also be used.

The client computing system comprises at least three main components—host software, chipset hardware/firmware, and the CPU/GFX/Media engines. It is assumed in embodiments of the present invention that the host software is untrusted. Even if the host software gets attacked, no secrets will be compromised. Host software is responsible for network connection to SP server 104 and downloading media from content server 216. Host software acts as a proxy between various SP servers and the chipset hardware/firmware. Host software sends encrypted content directly to the graphics hardware after the chipset hardware/firmware has completed title key unwrap and injection into the CPU/GFX component.

Chipset hardware/firmware is responsible for all protected processing, taking the role of the protected device for content protection processing. In an embodiment, the chipset hardware/firmware sends protected title keys to the graphics hardware using the DMI mechanism.

The CPU/GFX component is responsible for final stream decryption, decode and display. The GFX engine is a passive device, making no policy decisions. When asked, the GFX engine simply decrypts the content, then decodes the submitted video slices. In an embodiment, the GFX engine (with protected media encoders) re-encrypts the display content for HDCP output protection over HDMI and wireless (e.g., WiDi) displays.

A protected client computing system must be remotely identified by a service provider before sending highly sensitive information. The mechanism used to identify the platform must not violate user privacy. Embodiments of the present invention provide a protected mechanism for a service provider to verify over the network that the service provider server is communicating to a suitable client computing system and transfer title keys and other confidential material to that client computing system. In one embodiment, the protocol utilized to establish a protected session between the service provider server and the client computing system is EPID. EPID allows for a single public key to anonymously verify the signature generated by N-private keys in what is called an EPID group. To implement EPID, each chipset contains a unique private key blown into the platform control hub (PCH) fuses during silicon manufacturing. In an embodiment, the chipset manufacturer places 1,000,000 private keys in a single group and produces 400 groups for each chipset produced. In order to act as the EPID verifier, each service provider will be provisioned with these 400 public keys.

Once a protected EPID session has been established, the service provider server is free to exchange protected confidential information with the protected client computing system. For content streaming, protected title keys may be passed from an SP server to the security processor in the chipset. The security processor sends the protected title keys to the graphics and audio hardware. At this point, encrypted video and audio content can be directly sent from a content server 216 to client computing system graphics and audio hardware which decrypts, decodes, and displays the content. For downloading content, the security processor binds the title keys to the client computing system using a unique platform storage key (again burned into PCH fuses during manufacturing) and returns the bound keys to media player software. When playback is desired, the bound title keys are re-submitted to the security processor, which unbinds and sends them in a protected manner to the graphics and audio hardware.

Figure 3:
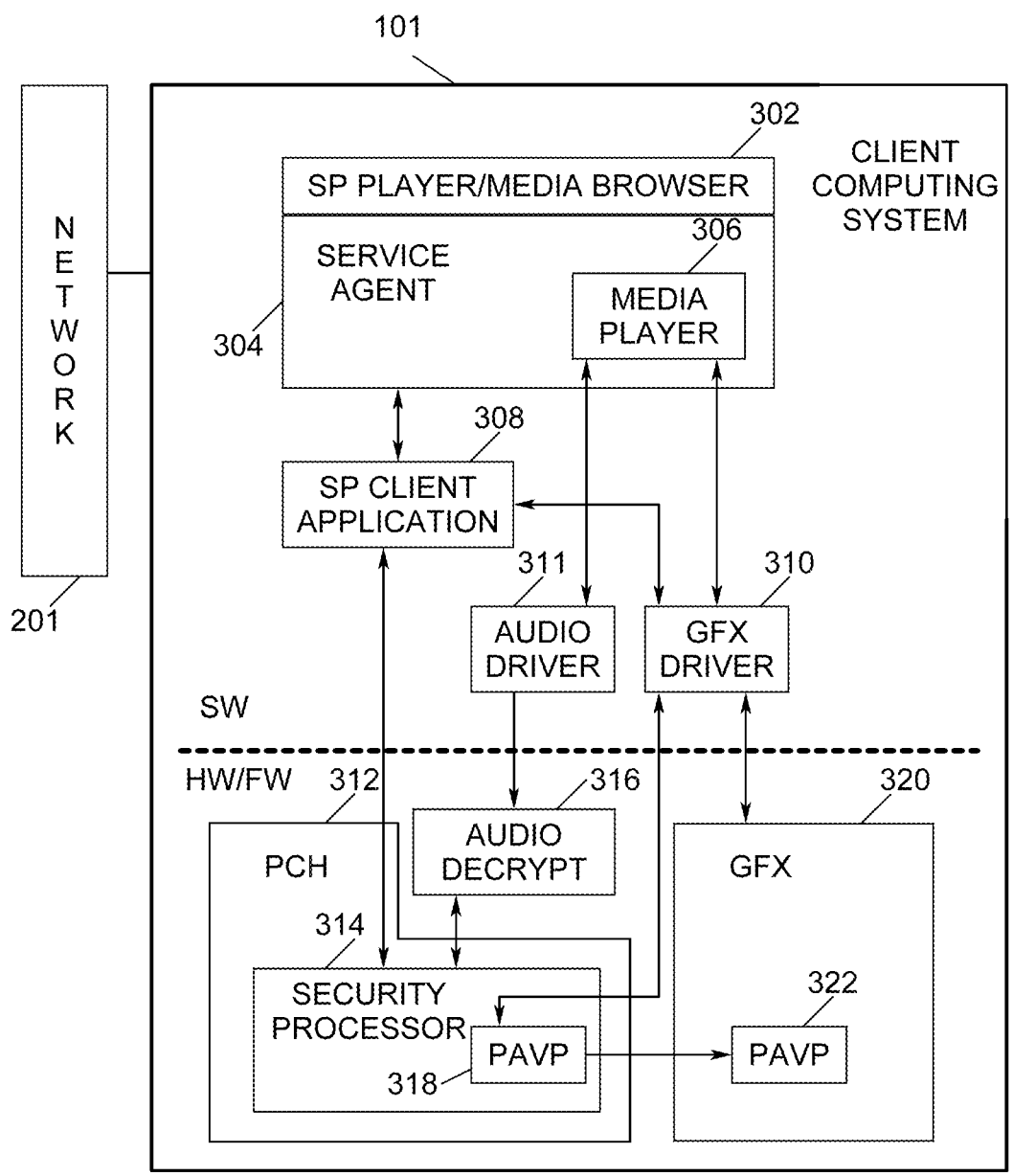
FIG. 3 is a diagram of a client computing system according to an embodiment of the present invention.

FIG. 3 is a diagram of a client computing system 101 according to an embodiment of the present invention. A service provider (SP) player/media browser software application 302 may be included in the software stack to interface with the SP server 104 over a network 201 such as the Internet. The SP player/media browser 302 allows a user to browse content offerings of the service provider and to select content to be delivered from the SP server to the client computing system. The SP player/media browser provides user interface controls for the user to manage a content library and to control the selection, downloading, and playback of content. The SP player/media browser interacts with service agent 304. Service agent 304 comprises a software application provided by a service provider that is authorized to access the features of the client computing system supporting end-to-end content protection according to embodiments of the present invention. The service agent interfaces with various SP player/media browser application programming interfaces (APIs) (not shown in FIG. 2). Service agent 304 comprises a media player component 306. The media player provides the content player functionality (e.g., controlling playback).

SP client application 308 enables the SP player/media browser 302 and the service agent 304 to access content protection features on the client computing system's hardware and firmware and for relaying messages to the service provider server 104. In an embodiment, the SP client application comprises a host agent software development kit (SDK) including content protection APIs. In an embodiment, the SP client application communicates with the security processor 314 in the platform control hub (PCH) 312 of the chipset.

Audio driver 311 provides an interface between the media player and audio decrypt hardware 316. Similarly, graphics (GFX) driver 310 provides an interface between the media player and the GFX engine 320. In an embodiment, the PCH 312 comprises security processor 314, which executes firmware to provide content protection functionality, along with other well known system functions. In an embodiment, the security processor may be implemented by a Manageability Engine (ME). As content is handled by the PCH 312 and the GFX engine 320, the content may be protected at least in part by Protected Audio Video Path (PAVP) components 318, 322 in the PCH hardware/firmware and GFX engine hardware, respectively.

Figure 4:
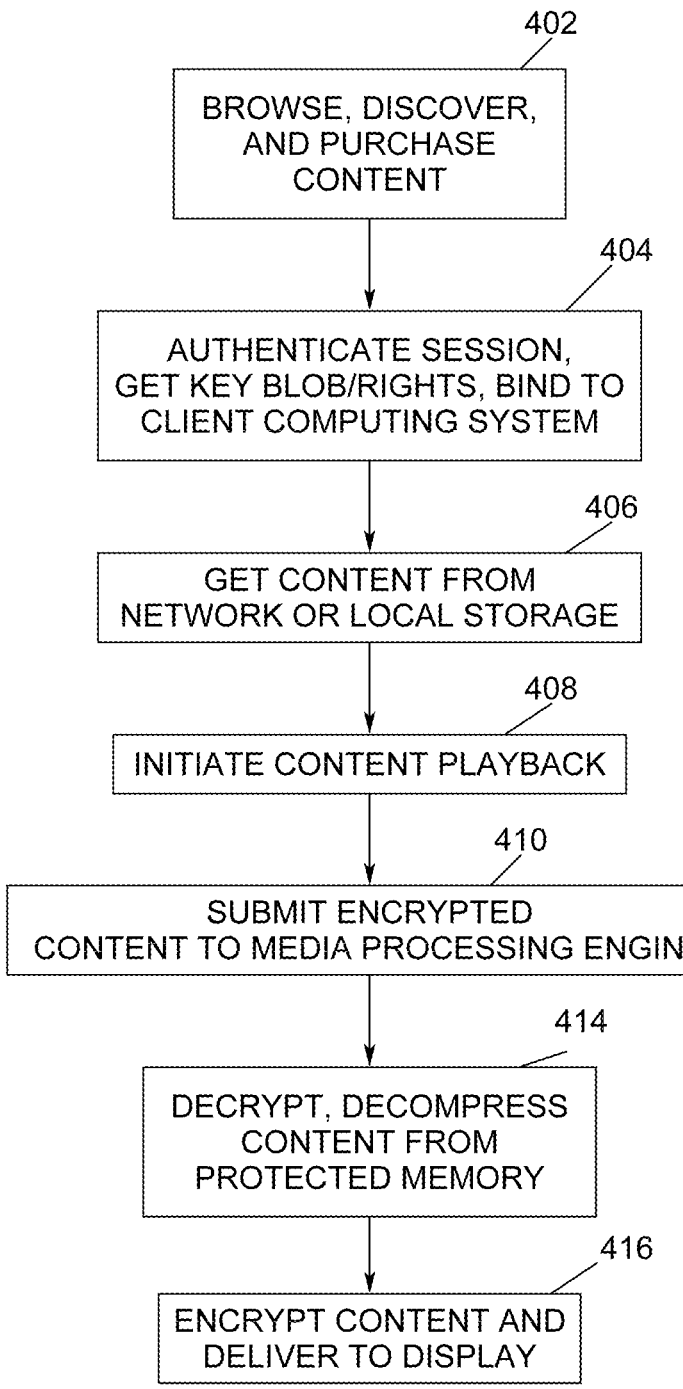
FIG. 4 is a flow diagram of secure content processing according to an embodiment of the present invention.

FIG. 4 is a flow diagram of secure content processing according to an embodiment of the present invention. At block 402, a user of the client computing system uses SP player/media browser 302 to browse, discover, and purchase content from one or more service providers. At block 404, mutual authentication of the SP Server 104 and the client computing platform 101 is performed. An authenticated session is established. Key blobs with usage rights for a given set of content are provisioned. The key blobs are bound to the client computing system to ensure that the system is both confidentiality and integrity protected as necessary.

The client computing system then gets the encrypted content at block 406 from content server 216 over network 201 (for streaming operations) or from local storage on the client computing system (for content previously purchased, downloaded, and stored). The system is prepared to work on video slices (e.g., sub-frame). As a result, the hardware can process the data as soon as the first slice of data is submitted.

At block 408, the user initiates playback of the selected content using the SP player/media browser 302. The key blob is submitted to the security processor 314 for unpacking and extracting of the title key. When that is done, the title key is loaded by the security processor into the graphics hardware 320 for decryption. The SP player/media browser submits the encrypted content to the media processing engine within GFX engine 320 at block 410. The GFX engine decrypts the content using the title keys and re-encrypts the content using a local protected key. Re-encrypted data may be stored in protected local or system memory. The re-encrypted content is subsequently obtained, decrypted, and decompressed at block 414. The decrypt is performed first. Once the data is decrypted, the data is decoded/decompressed. Once the data is decompressed, the data is re-encrypted and passed to the composition engine via the system memory. Once the composition is finished, the data is again protected and passed using system memory to the display engine. In an embodiment, each component along the way has the ability to decrypt, process and re-encrypt as necessary.

At block 416, the GFX engine re-encrypts the media content using HDCP technology (in an embodiment) and delivers the content to the display for viewing by the user. At each step of the process, the content is never in the clear where it is accessible by software or unauthorized hardware components running on the client computing system.

Figure 5:
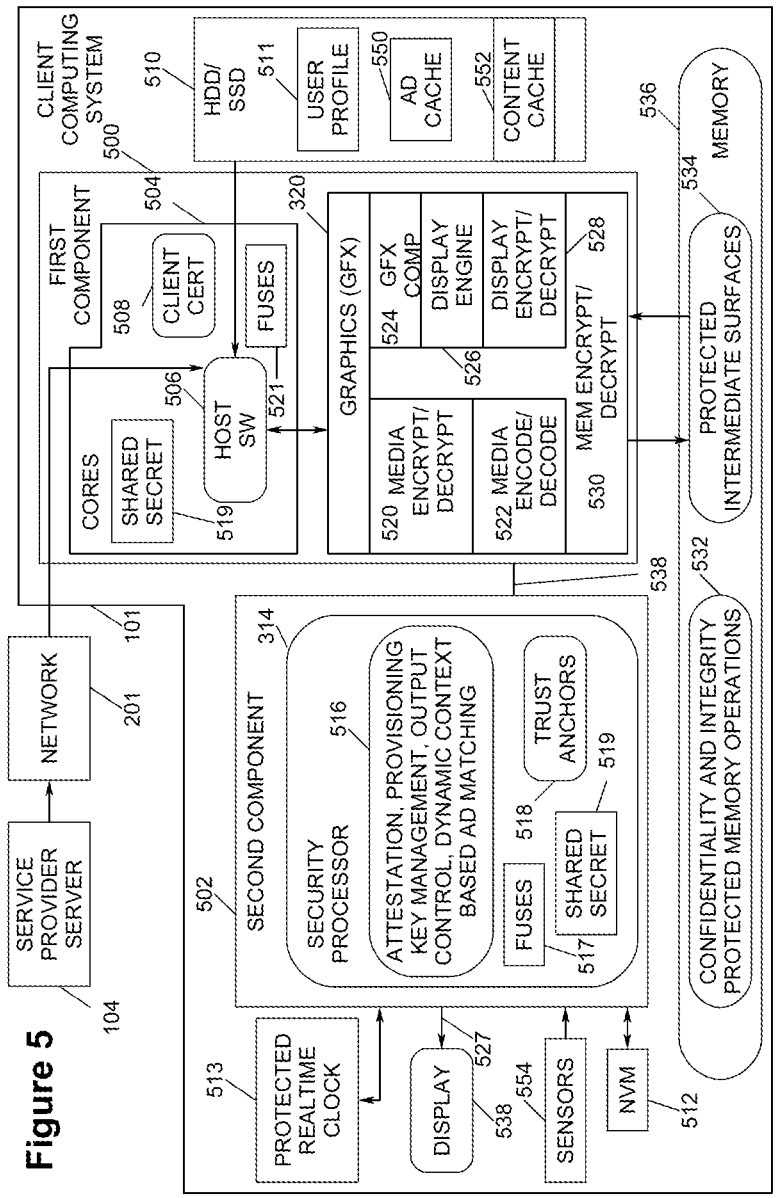
FIG. 5 is a diagram of a secure content processing system according to an embodiment of the present invention.

FIG. 5 is a diagram of a secure content processing system according to an embodiment of the present invention. A SP server 104 interacts over network 201 to client computing system 101. Client computing system comprises first 500 and second components 502. In an embodiment, the first component comprises a CPU and GFX component, and the second component comprises a platform control hub (PCH). In another embodiment, the first and second components may be combined into a single component in a system-on-a-chip (SOC) implementation. First component 500 includes a plurality of processor cores 504, and GFX engine 320. Processor cores 504 execute various components of host software (SW) 506 (as described in FIG. 3), a client certificate 508, fuses 521, and a shared secret 519. Host SW reads data, including encrypted content previously obtained from a SP server or tangible media (such as a DVD, Blu-Ray, or other storage technology), from hard disk drive (HDD)/solid state drive (SSD) 510. In an embodiment, Host SW comprises at least a SP player/media browser application 302, a service agent 304, and a SP client application 308. In an embodiment, HDD/SSD includes one or more user profiles 511.

GFX engine 320 comprises a plurality of components. Media encrypt/decrypt engine 520 comprises logic to encrypt and decrypt content. Media encode/decode engine 522 comprises logic to encode and decode content. GFX Composition (Comp) engine 524 comprises logic to construct display images. Display engine 526 comprises logic to pass the composed display images to the display. Display encrypt/decrypt engine 528 comprises logic to encrypt and decrypt display data prior to sending the display data to display 538 over protected link 527. Memory encrypt/decrypt engine 530 comprises logic to encrypt and decrypt data stored in protected intermediate surfaces 534 in memory 536. Memory 536 also includes logic to implement confidentiality and integrity protected memory operations 532.

Second component 502 comprises a plurality of components, some of which are not shown in order to simplify FIG. 5. Second component comprises a security processor 314. Security processor includes firmware and/or hardware logic to provide attestation, provisioning key management, output control, and ad matching operations 516 for the client computing system. Security processor also includes fuses 517, shared secret 519, and trust anchors 518 for supporting a PKI such as verification keys and key hierarchy information. Fuses 521, 517 are programmed into the hardware of the first and second components during manufacturing of the chipset with key material for EPID use. The hardware root of trust is built up from the information programmed into the fuses on the manufacturing floor when the client computing system is manufactured. This ensures that each individual client computing system is unique, yet privacy protected. Shared secret 519 is hard-coded into the hardware of the first and second components during manufacturing of the chipset and CPU/GFX components. In an embodiment, the shared secret may be used in setting up the secure chip to chip communications channel over the DMI link 538.

Client computing system also includes a protected real time clock 513 for providing secure clock services, a display 538, and a non-volatile memory (NVM) 512. In an embodiment, the protected real-time clock may be seeded by a third party, and may be virtualized for multiple service providers. The NVM may be used to store the firmware image for the second component, as well as to store temporary data (such as integrity and state information) for security processor processing operations.

In an embodiment, a processing flow may be described as follows. SP player/media browser 302 presents a user interface to the user. The user goes to the service provider's web site to browse available content. The SP web site has an auto detection capability to determine if the user's client computing system has integrated within it the capability of authenticating with the SP server 104. If capable, the user is allowed to choose content. The content may be bought, rented, or subscribed to, or may be streamed. The user pays for the content. SP player/media browser 302 invokes security processor 316 to authenticate the client computing system 101 with the SP server 104. In an embodiment, the authentication uses EPID technology. The client computing system 101 is authenticated at least in part by having the SP server 104 verify the client computing system's certificate 508, perform a revocation check, and verify a certification path to a certificate authority (using the EPID protocol in one embodiment). When both the client computing system 101 and the SP server 104 are authenticated, a secure communications channel may be set up based on the EPID protocol in one embodiment. In an embodiment, once the secure communication channel is set up, a command set may be used for end to end content protection capabilities.

The SP Server 104 provisions an encrypted title key to the client computing system, with constraints on usage of the content (e.g., time). The SP server sends the encrypted title key over the secure channel to security processor 314. Security processor 314 decrypts the encrypted title key, using its own key hierarchy. Security processor 314 uses a storage key to re-encrypt the newly decrypted title key to form a key blob. The key blob is bound to the client computing system for a specified time period. Security processor 314 sends the key blob to SP player/media browser 302 running in the CPU core. SP player/media browser 302 stores the key blob in HDD/SSD 510. SP player/media browser 302 then downloads the user-selected encrypted content. In one embodiment, the downloaded encrypted content may be stored in a content cache 552 in the HDD/SSD 510.

When a user wants to play the content, the SP player/media browser 302 submits the key blob back to the security processor 314. The security processor verifies the signature of the key blob, and checks usage constraints such as time, for example. The security processor 314 sends the encrypted title key over the encrypted channel (e.g., DMI link 538) to the media encrypt/decrypt component 520 of the GFX engine 320. The security processor instructs the SP player/media browser that the GFX/media engine is ready to process the encrypted content. In an embodiment, the SP player/media browser 302 reads the encrypted content from content cache 552 in HDD/SDD 510, or obtains the encrypted content from the SP server 104 over the network 201 (for a streaming application), and sends the encrypted content to the GFX engine slice by slice.

The GFX engine 320 processes the encrypted content in a slice by slice manner. For each slice, the SP player/media browser reads the slice headers in the clear. The rest of the slice is encrypted so that the SP player/media browser cannot access the content. The SP player/media browser keeps track of playback state information using an initialization vector. The media encrypt/decrypt engine 520 decrypts the content using the title key, after decrypting the encrypted title key received from the security processor. In one embodiment, the output data of the media encrypt/decrypt engine is still compressed according to the well-known H.264 encoding scheme. In other embodiments, other encoding schemes may be used. The media encode/decode engine 522 decodes each slice and then re-encrypts the slice using memory encrypt/decrypt 530. The re-encrypted content slice is stored in protected intermediate surfaces 534 in memory 536. GFX composition engine 524 controls the composition of the image to be displayed on the display, including the foreground and background images, windows, etc. The GFX composition engine obtains the re-encrypted content slices from protected intermediate surfaces 534 in memory 536 to generate the composed image. The GFX composition engine 524 sends the composed image data to the display engine 526.

The display engine uses display encrypt/decrypt engine 528 to decrypt the composed image from the encryption that was used to store the content slices in memory 536. The display engine 526 uses the display encrypt/decrypt engine to re-encrypt the composed image data according to the HDCP technology, in one embodiment. The encrypted composed image data is sent by the GFX engine 320 over the protected chip to chip data interface (e.g., DMI link) 538 to the second component 502, for transfer to the display 538 over protected display interface link 527.

In an embodiment, there can be any number of concurrent, independent content streams being processed by the client computing system. Each content stream has its own cryptographic context so as not to interfere with other streams. This also allows for the client computing system to ensure that any kind of attack or compromise on one stream does not affect the other content streams.

In an embodiment, HDD/SDD 510 comprises at least one user profile 511 and an ad cache 550, both of which are discussed further below. In an embodiment, client computing system comprises one or more sensors 554 coupled to second component 502. Sensors sense the environment surrounding the client computing system and report sensor information to security processor 314 for use by attestation, provisioning key management, output control, and dynamic context based ad matching component 516. In an embodiment, sensors may include a GPS system, accelerometer, compass, vibration detector, and/or other sensors.

Embodiments of the present invention provide the capability for dynamically inserting selected advertising into digital content at the client computing system. Embodiments provide a method for inserting ads into content that is prepared for the client computing system and for a dynamic advertising matching process that is securely implemented within the HW ROT. User profiles may be privacy protected and maintained with confidentiality protection in the client computing system and/or the SP server, respectively. When a client computing system makes a request to the SP server for an advertising stream, the request may be made with the client's EPID signature, which is inherently privacy protected. The HW ROT will protect, based on triggers, insertion of the advertising stream into the linear rendering flow of the content. In an embodiment, triggers may be based on audio watermarks or on an even-track in an MP4 filed used for packaged media.

Figure 6:
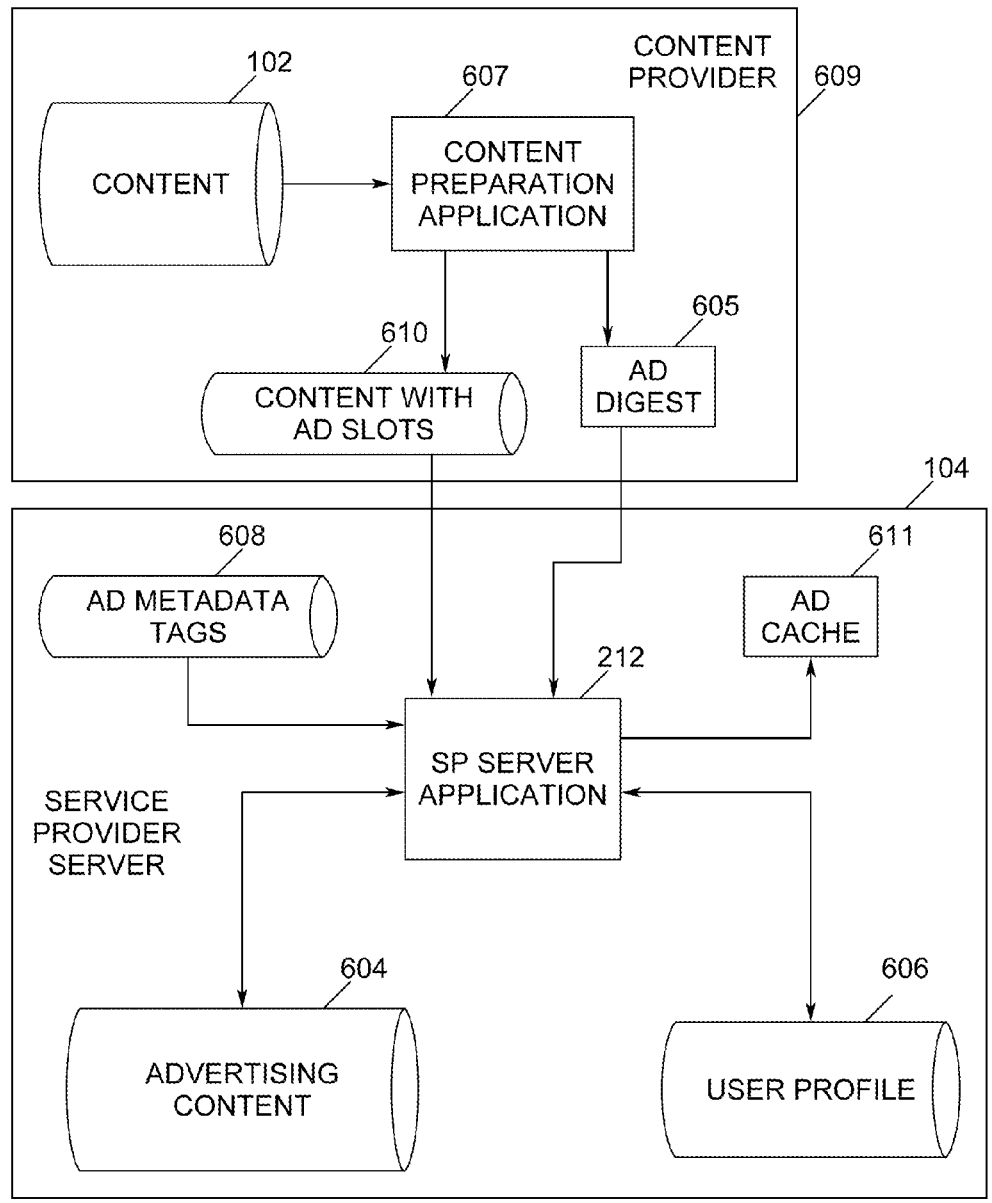
FIG. 6 is a diagram of service provider server and content provider components according to an embodiment of the present invention.

FIG. 6 is a diagram of service provider server and content provider components according to an embodiment of the present invention. In an embodiment, content provider 609 uses content preparation application 607 to analyze content 102 and insert ad slots into the content to form content with ad slots 610. An ad slot comprises a marker within the content denoting where an ad may be inserted at a later point in time. Ad digest 605 comprises information describing at least where the ad slots are located in content with ad slots 610. In an embodiment, ad digest 605 may also include one or more of metadata, extended markup language (XML) code, specified encryption and/or encoding schemes, media processing settings, and interactive instructions (such as instructions for performing selected tasks before and/or after showing the ad). In an embodiment, insertion of an ad into the content at the point of an ad slot may be done on client computing system 101. In another embodiment, insertion of an ad into the content at the point of an ad slot may be done on SP server 104. Content with ad slots 610 and ad digest 605 may be communicated from the content provider to SP server 104 using any means. In an embodiment, the content provider and the service provider may be separate entities. In another embodiment, the content provider and the service provider may be the same entity.

Figure 7:
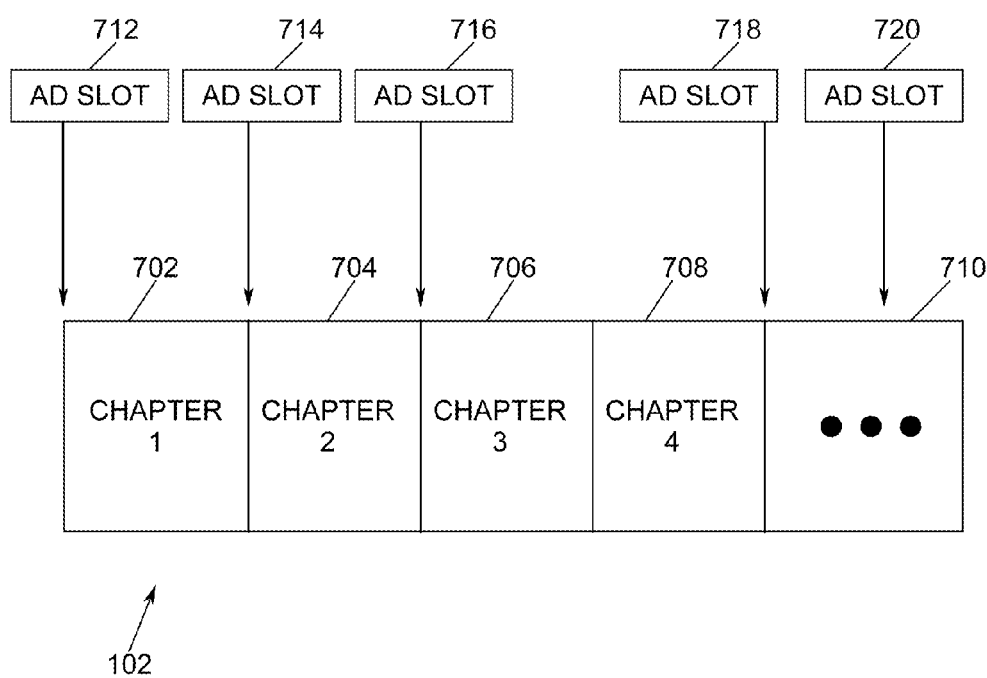
FIG. 7 is a diagram of ad slots and content chapters according to an embodiment of the present invention.

FIG. 7 is a diagram of ad slots and content chapters according to an embodiment of the present invention. In an example of content 102 having multiple chapters 702, 704, 706, 708, and 710, ad slots 712, 714, 716, 718, and 720 may be inserted by the content preparation application 607 into locations within the content as shown. However, any number of ad slots may be inserted into the content, and they may be inserted at any location in the content (not just at chapter beginnings and endings as shown in this example). An ad slot may be inserted into the content such that the overall content duration is extended by the length of the ad slot.

SP server application may securely send content with ad slots 610 and/or ad digest 605 to the client computing system. In various embodiments, either SP server application 212 on the SP server 104 or SP player/media browser 302 on the client computing system 101 detects the ad slots based at least in part on ad digest 605 and obtains the advertising content (if not already stored within the SP server or ad cache 550 within the client computing system, as appropriate). In an embodiment, the advertising content may be obtained as needed in real time from an advertising server (not shown) coupled to the network. The SP player/media browser 302 then displays the ads at the specified time during content rendering on the client computing system.

In an embodiment, content preparation application 607 may generate the ad digest describing where the ad slots are to be inserted, but not actually create the ad slots in the content. In this embodiment, content provider 609 sends content 102 and the ad digest to the SP server, and the SP server creates the ad slots in the content to form content with ad slots 610 based at least in part on the received ad digest.

In an embodiment, the SP server application 212 may securely maintain a user profile 606 on the SP server 104 for each user of a client computing system. The user profile comprises at least one of preferences and interests of the user. In one embodiment, the user may enter or select his or her preferences and/or interests by affirmative action by the user using the SP player/media browser 302. In another embodiment, the SP server application may develop and maintain the user profile based at least in part on the content and/or ads delivered to the user's client computing system (e.g., viewing history) and/or the user inputs received by the SP server over time. In another embodiment, user inputs may be received via sensors coupled to the client computing system, and other input mechanisms such as via a touch screen, gesture recognition, Bluetooth devices, or remote control devices. In an embodiment, the preferences may include what types of information the user is interested in, and how, when and in what format the user wants to receive the information. In an embodiment, preferences may include purchase parameters, such as financial limits for purchases, purchase notifications and approvals, etc. Other preferences may also be specified. In an embodiment, interests may include things the user selects as interests (e.g., sports, hobbies, television, film, and music genres, etc.) as well as interests determined by analyzing past behavior, such as received user inputs and delivered and/or consumed ads and/or content. In an embodiment, the user inputs may be stored as part of the user profile. In an embodiment, the user profile 606 may also be stored in the client computing system as user profile 511.

In an embodiment, SP server application uses one or more of the user profile 606, ad metadata tags 608, ad digest 605, to select ads from advertising content 604 for insertion into content with ad slots 610. In an embodiment, selecting ads from advertising content 604 may be performed by the SP server application using an ad matching process. In an embodiment, selected ads may be obtained from advertising content 604 and stored in ad cache 611. In an embodiment, the number of selected ads stored in the ad cache may be more than the number of ad slots in content with ad slots 610.

In an embodiment, ads described by one or more ad metadata tags 608 may be obtained as needed from another entity over network 201. In another embodiment, selected ads may be obtained, securely communicated to the client computing system, and stored in ad cache 550 in HDD/SSD 510 of the client computing system. Ads may comprise any audio, video, or image content. In an embodiment, ads selected from advertising content 604 may be inserted into content with ad slots 610 at one or more ad slots, either by the SP server or the client computing system. Each ad may be uniquely identified and tagged with metadata.

Existing content metadata tags for audio content include information such as sampling rate, audio compression standard, artist, title, album, and so on. Existing content metadata tags for video content include information such as title, frame rate, video frame size, video frame format, video compression standard, chapters, captions, menus, duration, sub-titles, and so on. Ad metadata tags 608 may comprise one or more of an ad slot ID, ad duration, ad uniform resource locator (URL), ad type, ad report URL (e.g., a location to report ad usage statistics), and other information. Ad slots may include different sets of information depending on the type of ad slot. For example, an ad slot for a movie may include different information than an ad slot for a TV program.

In embodiments of the present invention, ads may be dynamically selected and/or personalized on the SP server and/or on the client. When selected on the SP server, in one embodiment the SP server fetches selected ads from ad cache 611 and inserts the ads into the appropriate ad slots of content with ad slots 610 using ad digest 605, and communicates the resulting modified content to the client computing system for subsequent rendering to the user. In another embodiment, the SP server selects the ads, populates the ad cache 611, and sends the ad cache along with content with ad slots 610 and ad digest 605 to the client computing system for insertion and playback. In an embodiment, the SP server may securely communicate the ad cache 611 and ad digest 605 to the client computing system separately from the content with ad slots 610. In an embodiment, there may be multiple ad digests defined for a single content with ad slots 610.

When selected by the attestation, provisioning key management, output control and dynamic context based ad matching component in the security processor 314 on the client computing device, in one embodiment the security processor selects the ads based on an ad matching process, obtains the ads from SP server 104 or other source via network 201, and stores them in ad cache 550 on the client. Content with ad slots 610 may be stored by the client computing system in content cache 552 of the HDD/SSD 510. Ad digests may also be stored in the HDD/SSD. At a later point in time, the security processor 314 instructs the graphics engine 320 to insert the ads from the ad cache into the content stream obtained from the content cache 552 during playback processing based at least in part on the ad slots, current context information of the client, and the ad digest. The ad cache, the ad digest, and of course the content with ad slots may be cryptographically protected using methods described above. In an embodiment, the ads may be encrypted using the same title key as was used for encrypting the content. In another embodiment, a different key may be used. This different key may be securely communicated to the client computing system in the same manner as the title key. In a further embodiment, the ads may be left unencrypted.

When dynamically selected on the client, ad selection may be based on one or more local contextual factors known by or discovered by the security processor 314 of the client computing system. The one or more contextual factors may include sensor information obtained from sensors 554. In an embodiment, the geographic location of the client computing system may be used to determine in real time which ads are to be inserted into ad slots in the content stream. For example, ads for local businesses may be inserted based on the current location of the client computing system. In an embodiment, the type of device comprising the client computing system may be used to determine which ads are to be inserted. That is, whether the client computing system is a tablet computer, desktop PC, laptop PC, netbook, smartphone, set top box, etc., and/or the size, format, and/or resolution of the display of the client computing system, may be taken into account when determining ads. In a further example, the current usage model of the client computing system may also be used, such as whether the display of the content by the client computing system is personal (i.e., solo) or communal (i.e., multiple viewers).

Other ad matching factors may include a current mobility status, such as whether the client computing system is stationary, mobile (e.g., connected to a public hotspot,) or nomadic (in transit on a transportation system such as a subway car, train, automobile, etc.), the type of content (e.g., movie vs. TV program), whether the client computing system is currently connected over a network to the service provider or not, whether the content has been downloaded to the client computing system or is being streamed over a network, whether the content has been purchased or is ad-supported, whether the client computing system's current user interface (UI) is a touch screen or other direct manipulation UI vs. a "lean back" passive viewing/UI mode, and whether a single content stream or multiple content streams are being processed by the client computing system. Other ad matching factors may also be used.

Embodiments of the present invention also provide for ad measurement. That is, when an ad is selected and inserted into the ad slot for playback, the client computing system (via the security processor in one embodiment) may report back to the service provider server 104 which ads were served and how frequently. Additionally, each time a content stream is played back, embodiments of the present invention provide the ability to trigger tracking events for ad content when played and report such tracking events back to the service provider server 104.

Thus, playback of the same content title may provide a different viewing experience and different ads for the user(s) depending on factors such as geographic location, type of client computing system used, playback mode, and so on.

In embodiments of the present invention, security may be improved because ad slots and selected ads that are inserted into the content (either by the SP server or the security processor or the graphics engine on the client computing system) may be very difficult to remove or modify by the user or a hacker due to the security provided by the HW ROT. Any attempt to remove or modify the ad slots, the ad digest, and/or ads may be detected by the cryptographic techniques discussed above.

Figure 8:
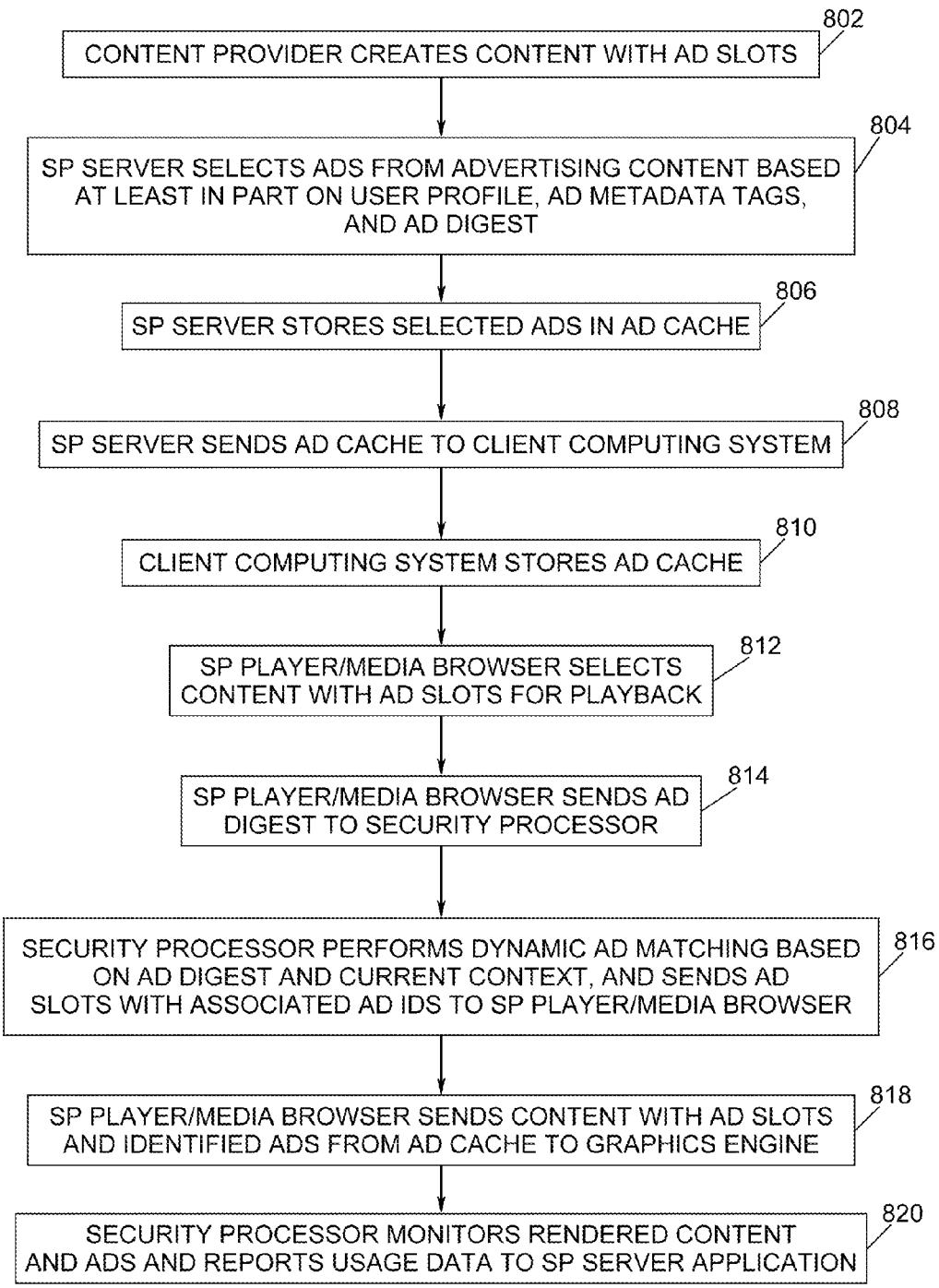
FIG. 8 is a flow diagram of dynamic ad insertion processing according to an embodiment of the present invention.

FIG. 8 is a flow diagram of dynamic ad insertion processing according to an embodiment of the present invention. At block 802, a content provider creates content with ad slots 610 by analyzing content 102. Content provider also creates ad digest 605 which includes information describing the ad slots for the content. At block 804, the SP server application selects ads from advertising content 604 based at least in part on the user profile 606, ad metadata tags 608, and the ad digest 605. Ad selection may be done by any suitable ad matching process. In an embodiment, there may be more ads selected for the ad cache for this content than there are ad slots in order to allow the security processor on the client computing system to dynamically tailor the content playback experience with selected ads from the ad cache. At block 806, the SP server stores selected ads in the ad cache. In one embodiment, if the client computing system is currently communicatively coupled with the SP server (i.e., "on-line"), the ad cache may specify the uniform resource locator (URL) of the selected ads. In another embodiment, if the client computing system is not currently communicatively coupled with the SP server (i.e., "off-line"), the ad cache may be populated with the ads by the SP server.

At block 808, the SP server sends ad cache 611 to the client computing system. The SP server may also send ad digest 605 to the client computing system. At block 810, the client computing system stores the received ad cache 611 as ad cache 550 in the HDD/SSD. In an embodiment, the SP player/media browser may request and/or receive the ad cache. The client computing system may also store the ad digest in the HDD/SSSD. In an embodiment, the ad cache and/or the ad digest may be encrypted using known means. The client computing system may store content with ad slots 610 either before or after storing the related ad cache and ad digest. Storage processing is now complete.

When at some later point in time the user desires to view content, playback processing starts at block 812 with SP player/media browser 302 (at the user's direction) selecting content with ad slots 610 for playback. Prior to sending the content with ad slots through the secure media processing pipeline described above with reference to FIG. 5, the SP player/media browser obtains the ad digest from the HDD/SSD and sends the ad digest to the security processor at block 814. At block 816, the attestation, provisioning key management, output control, and dynamic context based ad matching component 516 of security processor 314 performs a dynamic ad matching process based on the ad digest and the current context of the client computing system (as received by sensors 554 and current client computing system settings), and sends information describing the ad slots and associated ad IDs to the SP player/media browser. At block 818, the SP player/media browser securely sends the content with ad slots and identified ads (from the ad cache based on the ad IDs) to graphics engine (GFX) 320 for rendering on the display 538 for viewing by the user. In various embodiments, the ads may be pulled from ad cache 550 on the client, ad cache 611 on the SP server, or from another entity at a location over network 201. The identified ads are inserted into the ad slots during content rendering. In an embodiment, the ads and ad digest may be maintained in encrypted form except when being processing within the security processor and/or the graphics engine.

At block 820, the attestation, provisioning key management, output control, and dynamic context based ad matching component 516 of security processor 314 may monitor the rendered content and ads and report usage data describing the rendered content and ads back to the SP server application. The usage data may be encrypted and securely transmitted to the SP server based on methods described above.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A method of processing content in a client computing system, comprising:
   establishing a hardware-based root of trust between the client computing system and a service provider server;
   obtaining, by the client computing system, encrypted content and a key blob having at least one encrypted title key associated with the encrypted content from the service provider server;
   obtaining, by the client computing system, an ad digest and an ad cache from the service provider server, the ad digest comprising information describing ad slots in the encrypted content, and the ad cache comprising ads for insertion into the ad slots;
   storing, by the client computing system, the obtained ad cache and the ad digest in a memory device;
   initiating, by a media player of the client computing system, playback of the encrypted content;
   sending, by the media player, the ad digest to a security processor of the client computing system;
   performing, by the security processor, an ad matching based on the ad digest and contextual information of the client computing system and sending the ad slots and information on the matched ads of the ad slots to the media player;
   retrieving, by the media player, ads from the ad cache based on the information on the matched ads;
   sending, by the media player, the retrieved ads and the encrypted content to a graphic engine device of the client computing system over a protected audio/video path at a full system memory bandwidth;
   receiving, by the graphics engine device, the encrypted title key from the security processor over a protected chip to chip data interface;
   decrypting, by the graphics engine device, the encrypted content using the encrypted title key received from the security processor, and composing display image data with the retrieved ads received from the media player and the decrypted content;
   re-encrypting, by the graphic engine, the display image data within the graphics engine; and
   passing, by the graphic engine, the encrypted display image data to a display over a protected display interface.

2. The method of claim 1, further comprising encrypting the retrieved ads from the ad cache using the title key.

3. The method of claim 1, further comprising securely reporting playback of the retrieved ads from the ad cache to the service provider server.

4. The method of claim 1, wherein the contextual information comprises a geographic location of the client computing system.

5. The method of claim 1, wherein the contextual information comprises a type of device of the client computing system.

6. The method of claim 1, wherein the contextual information comprises a current usage model of the client computing system.

7. The method of claim 1, wherein the contextual information comprises a current mobility status of the client computing system.

8. The method of claim 1, wherein the contextual information comprises a connection status of the client computing system to a network.

9. The method of claim 1, wherein the performing an ad matching comprises selecting ads from the ad cache for insertion into the encrypted content at the ad slots based at least in part on a user profile.

10. The method of claim 9, wherein the user profile comprises at least one of preferences of the user, interests of the user, and past viewing history of the user.

11. The method of claim 1, wherein the number of ads in the ad cache is more than the number of ad slots in the encrypted content.

12. The method of claim 1, further comprising obtaining ads from an entity other than the service provider and at least one of storing the ads in the ad cache and obtaining the ads as needed in real time.

13. The method of claim 1, wherein the ad digest and the ads are encrypted by the service provider server and the encrypted ads are stored in the ad cache.

14. The method of claim 1, further comprising securely sending, by the security processor, information regarding usage of content and ads to the service provider server.

15. A non-transitory computer-readable medium comprising one or more instructions that when executed by at least one or more processors of a client computing system causes the client computing system to perform operation of processing digital content, the operation comprising:

establishing a hardware-based root of trust between the client computing system and a service provider server;

obtaining, by the client computing system, encrypted content and a key blob having at least one encrypted title key associated with the encrypted content from the service provider server;

obtaining, by the client computing system, an ad digest and an ad cache from the service provider server, the ad digest comprising information describing ad slots in the encrypted content, and the ad cache comprising ads for insertion into the ad slots;

storing, by the client computing system, the obtained ad cache and the ad digest in a memory device;

initiating, by a media player of the client computing system, playback of the encrypted content;

sending, by the media player, the ad digest to a security processor of the client computing system;

performing, by the security processor, an ad matching based on the ad digest and contextual information of the client computing system and sending the ad slots and information on the matched ads of the ad slots to the media player;

retrieving, by the media player, ads from the ad cache based on the information on the matched ads;

sending, by the media player, the retrieved ads and the encrypted content to a graphic engine device of the client computing system over a protected audio/video path at a full system memory bandwidth;

receiving, by the graphics engine device, the encrypted title key from the security processor over a protected chip to chip data interface;

decrypting, by the graphics engine device, the encrypted content using the encrypted title key received from the security processor, and composing display image data with the retrieved ads received from the media player and the decrypted content;

re-encrypting, by the graphic engine, the display image data within the graphics engine; and passing, by the graphic engine, the encrypted display image data to a display over a protected display interface.

16. The medium of claim 15, wherein the operation further comprising encrypting the retrieved ads from the ad cache using the title key.

17. The medium of claim 15, wherein the operation further comprising securely reporting playback of the retrieved ads from the ad cache to the service provider server.

18. The medium of claim 15, wherein the contextual information comprises a geographic location of the client computing system.

19. The medium of claim 15, wherein the operation of performing an ad matching comprises selecting ads from the ad cache for insertion into the encrypted content at the ad slots based at least in part on a user profile.

20. The medium of claim 19, wherein the user profile comprises at least one of preferences of the user, interests of the user, and past viewing history of the user.

21. The medium of claim 15, wherein the operation further comprising securely sending, by the security processor, information regarding usage of content and ads to the service provider server.

* * * * *